H.C. & A. Stouffer
Hay Fork
PATENTED
MAR 10 1868
75486
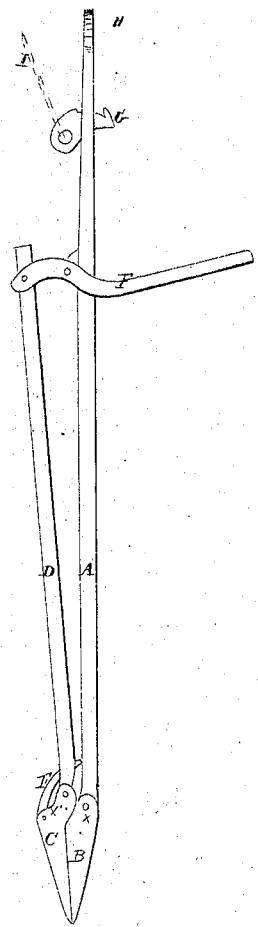
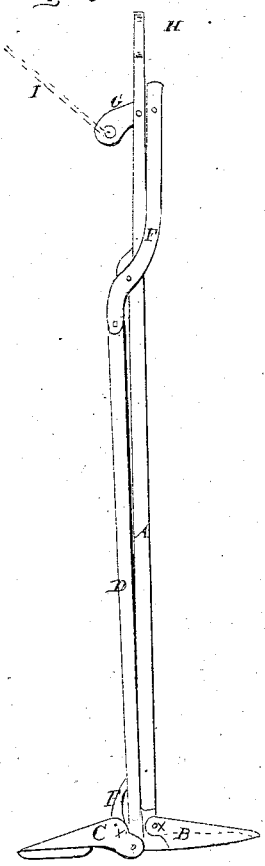
Witnesses
G.H. Burridge
J. Holmes
Inventors
H.C. & A. Stouffer

United States Patent Office.

HIRAM C. STOUFFER AND ABRAHAM STOUFFER, OF BEVER TOWNSHIP, OHIO.

Letters Patent No. 75,486, dated March 10, 1868.

IMPROVEMENT IN HORSE HAY-FORKS.

The Schedule referred to in these Letters Patent and making part of the same.

TO ALL WHOM IT MAY CONCERN:

Be it known that we, H. C. STOUFFER and A. STOUFFER, of Bever township, in the county of Mahoning, and State of Ohio, have invented certain new and useful Improvements in Hay-Forks; and we do hereby declare that the following is a full and complete description of the construction and operation of the same, reference being had to the accompanying drawings, making a part of this specification; in which—

Figure 1 is a view of the fork closed.
Figure 2 is a view of the fork open.
Like letters refer to like parts.

A, fig. 1, represents the shaft or shank of the fork, to the lower end of which is pivoted, at the point $x$, the tine B. To the heel of this tine is pivoted the heel of the tine C, and also the lower end of the link D, at the same point. The tine C is also connected to the shaft by the curved link E by pivoted connections. The upper end of the link D is connected to the shaft by the trip-lever F, and by which the tines are operated as follows, viz: On depressing the free end of the lever F to the position shown in fig. 1, the link D will be raised upward, and, in so doing, will draw up the heels of the tines, each heel acting as the minor arm of a lever, the fulcra of which are the pivots $x\ x'$. By this movement of the link, it will be obvious that the tines B C, the major arms of the lever, will be thrown out to the position shown in fig. 2, and which will be retained thus by the free end of the lever F being caught by the catch G, said catch passing through the lever, a slot being made in the end for its admission.

The practical application of this fork is as follows: The tines are brought together, as shown in fig. 1, and thus thrust into the hay, which may be supposed to be a load standing by the mow. The tines are then thrown out by raising the free end of the lever to the position shown in fig. 2, and secured thus by the catch referred to. The fork is then drawn upward by pulleys, to which it is attached by the loop H, and, with the lifted hay, is carried by appropriate means over the mow. The fork is then sprung by a cord, I, attached to the catch, which, on being pulled upward, is disengaged from the lever, and the weight of the hay on the tines will draw them together, and the hay drops into the desired place.

What we claim as our improvement, and desire to secure by Letters Patent, is—

The tines B C, links E D, and shaft A, in combination with the lever F, all constructed and arranged to operate in the manner as set forth.

HIRAM C. STOUFFER,
ABRAHAM STOUFFER.

Witnesses:
   W. H. BURRIDGE,
   J. HOLMES.